(12) United States Patent
Trifunovic

(10) Patent No.: US 8,132,345 B2
(45) Date of Patent: Mar. 13, 2012

(54) HYDRAULIC FUNCTION CONTROL WITH AUTO-CONTROL MODE OVERRIDE

(75) Inventor: Boris Trifunovic, Durango, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/663,569

(22) PCT Filed: Jun. 15, 2007

(86) PCT No.: PCT/US2007/014196
§ 371 (c)(1),
(2), (4) Date: May 19, 2010

(87) PCT Pub. No.: WO2008/153529
PCT Pub. Date: Dec. 18, 2008

(65) Prior Publication Data
US 2010/0222931 A1    Sep. 2, 2010

(51) Int. Cl.
*E02F 5/02* (2006.01)
*G06F 19/00* (2011.01)

(52) U.S. Cl. .................. 37/348; 37/414; 701/50
(58) Field of Classification Search .............. 37/348, 37/382, 414; 172/2–12; 701/50; 91/358 R
See application file for complete search history.

(56) References Cited

U.S. PATENT DOCUMENTS

| | | | |
|---|---|---|---|
| 3,643,828 A * | 2/1972 | Elliott | 414/699 |
| 4,015,729 A * | 4/1977 | Parquet et al. | 414/694 |
| 4,288,196 A * | 9/1981 | Sutton, II | 414/699 |
| 4,630,685 A * | 12/1986 | Huck et al. | 172/7 |
| 4,805,086 A | 2/1989 | Nielsen et al. | |
| 4,844,685 A * | 7/1989 | Sagaser | 414/700 |
| 4,964,779 A * | 10/1990 | Sagaser | 414/708 |
| 5,000,650 A * | 3/1991 | Brewer et al. | 414/699 |
| 5,065,326 A | 11/1991 | Sahm | |
| 5,629,849 A | 5/1997 | Ahn | |
| 5,799,419 A | 9/1998 | Seo et al. | |
| 6,371,214 B1 * | 4/2002 | Anwar et al. | 172/1 |
| 6,609,315 B1 * | 8/2003 | Hendron et al. | 37/348 |
| 6,725,142 B2 | 4/2004 | Koch | |
| 6,879,899 B2 * | 4/2005 | Budde | 701/50 |
| 6,968,264 B2 * | 11/2005 | Cripps | 701/50 |
| 7,634,863 B2 * | 12/2009 | Stanek et al. | 37/348 |
| 7,748,147 B2 * | 7/2010 | Schoenmaker et al. | 37/348 |
| 7,752,778 B2 * | 7/2010 | Schoenmaker et al. | 37/348 |
| 7,752,779 B2 * | 7/2010 | Schoenmaker et al. | 37/348 |
| 7,797,860 B2 * | 9/2010 | Schoenmaker et al. | 37/348 |
| 2001/0027366 A1 | 10/2001 | Ikari | |

(Continued)

OTHER PUBLICATIONS

Notification of Transmittal of the International Search Report and the Written Opinion of the International Searching Authority, and the International Search Report (May 6, 2008)(7 pages).

*Primary Examiner* — Thomas Will
*Assistant Examiner* — Joan Misa

(57) ABSTRACT

A work machine (10) comprises an operator input device (28), an electro-hydraulic system (64), and a controller unit (46) that communicates with the operator input device (28) and the electro-hydraulic system (64). The controller unit (46) is programmed to operate the electro-hydraulic system (64) in an auto-control mode, and adapted to override the auto-control mode in response to predetermined behavior of the operator input device (28). An associated method is disclosed.

6 Claims, 7 Drawing Sheets

U.S. PATENT DOCUMENTS

| | | | |
|---|---|---|---|
| 2002/0073833 A1* | 6/2002 | Coombs et al. | 91/35 |
| 2006/0245896 A1* | 11/2006 | Alshaer et al. | 414/685 |
| 2007/0120660 A1 | 5/2007 | Yamada et al. | |
| 2008/0177450 A1* | 7/2008 | Daniel | 701/50 |
| 2009/0222176 A1* | 9/2009 | Florean et al. | 701/50 |

* cited by examiner

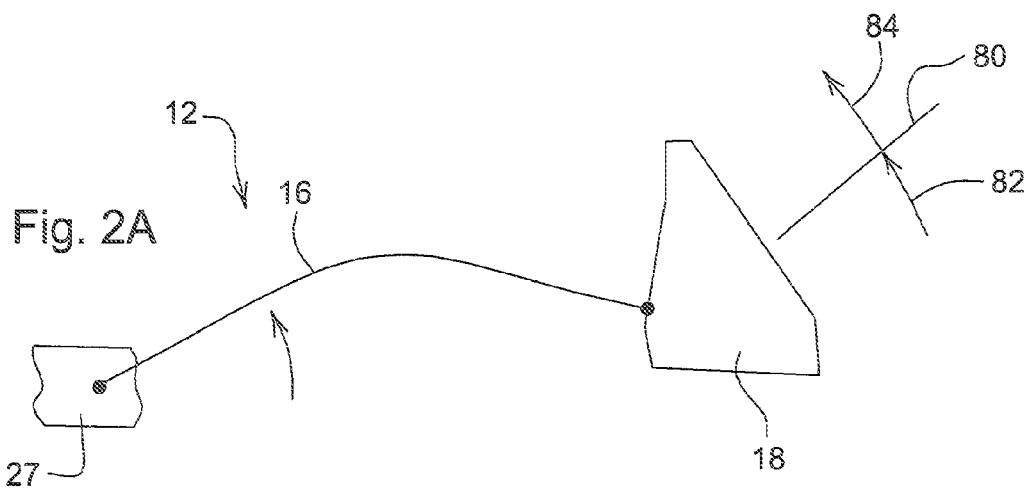
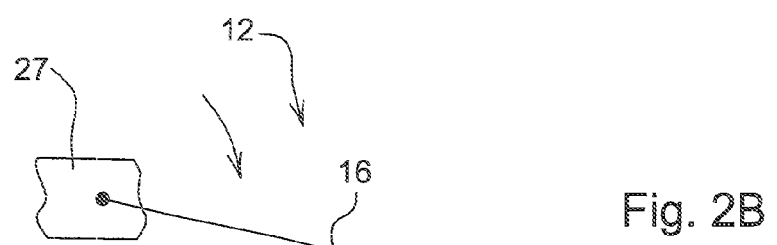
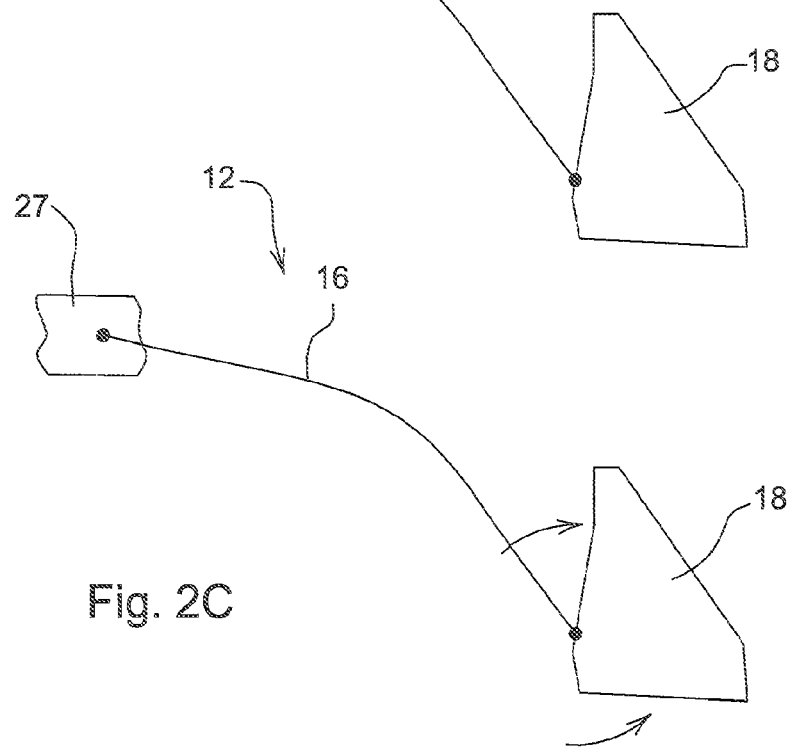

HYDRAULIC FUNCTION CONTROL WITH AUTO-CONTROL MODE OVERRIDE

FIELD OF THE DISCLOSURE

The present disclosure relates to control of hydraulic functions of work machines.

BACKGROUND OF THE DISCLOSURE

There are work machines in a wide variety of industries (e.g., construction, forestry, agricultural) configured to perform a number of functions by use of onboard hydraulics. Each such function may be referred to as a hydraulic function.

As used herein, the term "hydraulic function" means a hydraulically-performed operation on one or more components, wherein the one or more components is referred to herein as the "object of the hydraulic function" or just "object." The hydraulically-performed operation may itself be actuated mechanically, electrically, or by some other process. However, the operation on the object is accomplished hydraulically.

A loader backhoe is but one of numerous work machines configured to perform various hydraulic functions. For example, the loader portion of the loader backhoe may be configured to hydraulically raise and lower a boom and/or curl and dump a bucket attached to the boom, and the backhoe portion of the loader backhoe may be configured to raise and lower a boom, raise and lower an arm attached to the boom, curl and dump a bucket attached to the arm, swing the boom to the left and to the right, and/or extend and retract the arm (in the case of an adjustable length arm). Each such raising, lowering, curling, dumping, swinging left, swinging right, extending, and retracting is an example of a hydraulic function. Further, the component(s) (e.g., boom, bucket, and/or arm) which receive the hydraulically-performed operation of each such function is(are), exemplarily, the object of that function. This listing of hydraulic functions and objects is by no means intended to be exhaustive, because, as alluded to already, numerous hydraulic functions and objects thereof are possible for work machines.

SUMMARY OF THE DISCLOSURE

According to the present disclosure, there is provided a work machine comprising an operator input device, an electro-hydraulic system, and a controller unit that communicates with the operator input device and the electro-hydraulic system. The controller unit is programmed to operate the electro-hydraulic system in an auto-control mode. The auto-control mode is for automatically controlling performance of a hydraulic function in a predetermined manner independent of the position of the operator input device so as to move an object of the hydraulic function to, and stop the object of the hydraulic function at, a predetermined target position.

The controller unit is adapted to override the auto-control mode in response to predetermined behavior of the operator input device. Exemplarily, the controller unit adapted to monitor the position of the operator input device, activate the auto-control mode in response to displacement of the operator input device to an activate-auto zone relative to a neutral position of the operator input device, determine if the operator input device is positioned in the activate-auto zone as the object of the hydraulic function approaches the predetermined target position, and, if the operator input device is so positioned, override the auto-control mode by commanding movement of the object of the hydraulic function past the predetermined target position. An associated method is disclosed.

The above and other features will become apparent from the following description and the attached drawings.

BRIEF DESCRIPTION OF THE DRAWINGS

The detailed description of the drawings refers to the accompanying figures in which:

FIG. 2A is side elevation view showing a boom of the loader portion of the work machine at a predetermined upper boom position associated with a boom-height kickout automatic hydraulic function;

FIG. 2B is a side elevation view showing the boom of the loader portion at a predetermined lower boom position associated with a return-to-carry automatic hydraulic function;

FIG. 2C is a side elevation view showing a bucket of the loader portion at a predetermined bucket-roll position associated with a return-to-dig automatic hydraulic function;

DESCRIPTION OF THE DRAWINGS

Figure 1:
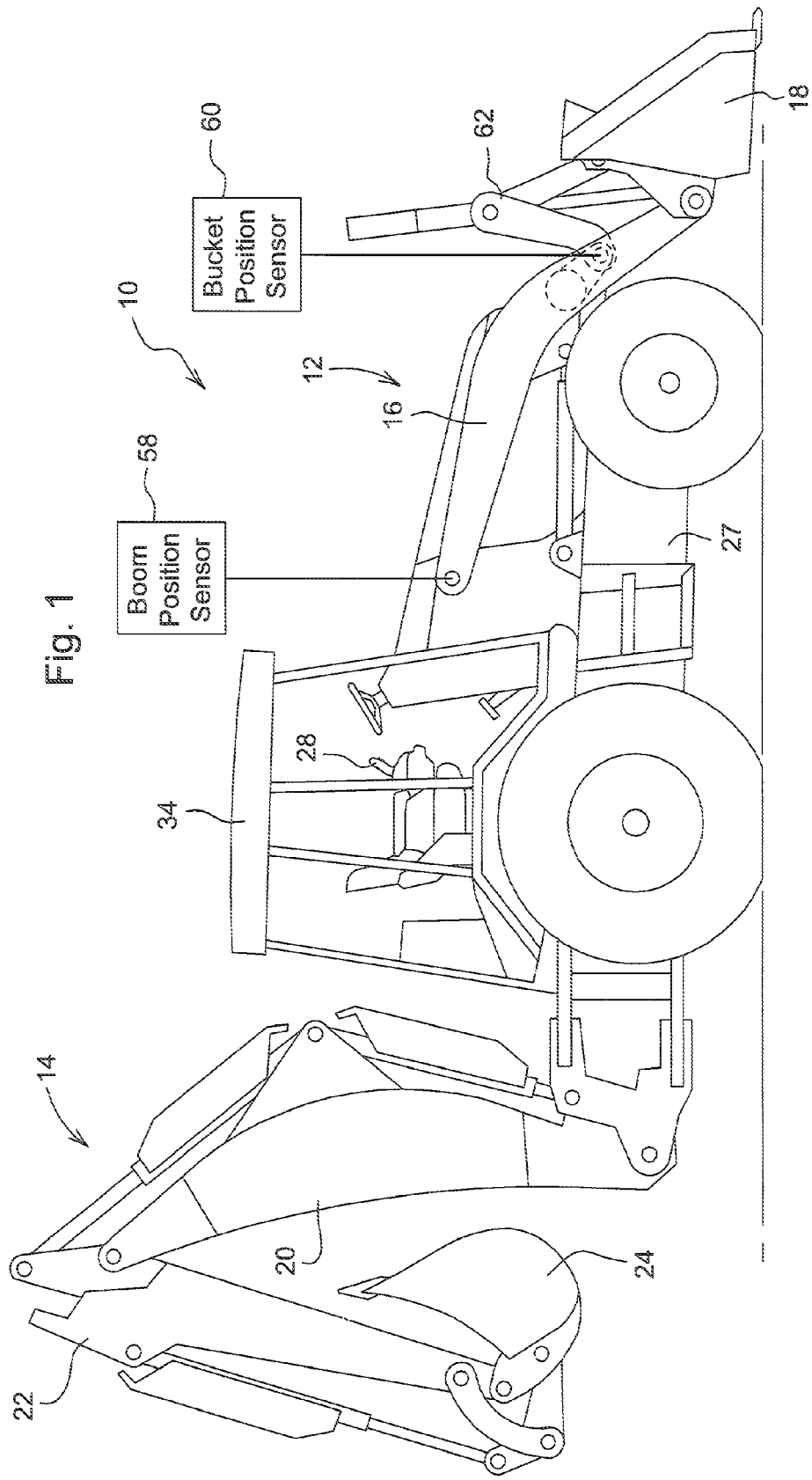
FIG. 1 is side elevation view of a work machine, in the form of, for example, a backhoe loader.

Referring to FIG. 1, there is shown a work machine 10 capable of performing a number of hydraulic functions. In the illustrated embodiment, the machine 10 is a loader backhoe, and, as such, the hydraulic functions capable of being performed thereby include, without limitation, those associated with the loader portion 12 and the backhoe portion 14. Regarding the hydraulic functions of the loader portion 12, the loader backhoe may be configured to hydraulically raise and lower a boom 16 and/or curl and dump a bucket 18 attached to the boom 16. As for the hydraulic functions of the backhoe portion 14, the backhoe portion may be configured to raise and lower a boom 20, raise and lower an arm 22 attached to the boom 20, curl and dump a bucket 24 attached to the arm 22, swing the boom 20 to the left and to the right, and/or extend and retract the arm 22 (in the case of an adjustable length arm). It is to be understood, however, that such functions are intended to be exemplary, since other types of work machines may be able to perform a wide variety of other hydraulic functions.

The work machine 10 is operable in a manual-control mode and an auto-control mode. The manual-control mode is for controlling performance of a hydraulic function as a function of the position of an operator input device 28, whereas the auto-control mode is for automatically controlling performance of the hydraulic function in a predetermined manner independent of the position of the operator input device.

The work machine 10 may be configured to perform a number of hydraulic functions automatically, each in a respective auto-control mode. For example, automatic hydraulic functions associated with the loader portion 12 may include, without limitation, boom-height kickout ("BHK"), return-to-carry ("RTC"), and return-to-dig ("RID").

Referring to FIGS. 2A-2C, in the auto-control mode of each automatic hydraulic function, the object of the respective hydraulic function is moved to, and stopped at, a predetermined target position, unless the auto-control mode is interrupted, as in an override of the auto-control mode, discussed in more detail below. In the loader backhoe example, in BHK, the boom 16 is automatically raised relative to a frame 27 (or other datum, such as the ground) of the machine 10 to, and stopped at, a predetermined upper boom position (see FIG. 2A), whereas, in RTC, the boom 16 is automatically lowered relative to the frame 27 (or other datum, such as the ground) to, and stopped at, a predetermined lower boom position (see FIG. 2B). In RTD, the bucket 18 is automatically rolled either in a curl direction or a dump direction relative to the boom 16 to, and stopped at, a predetermined bucket-roll position (see FIG. 2C).

Figure 3:
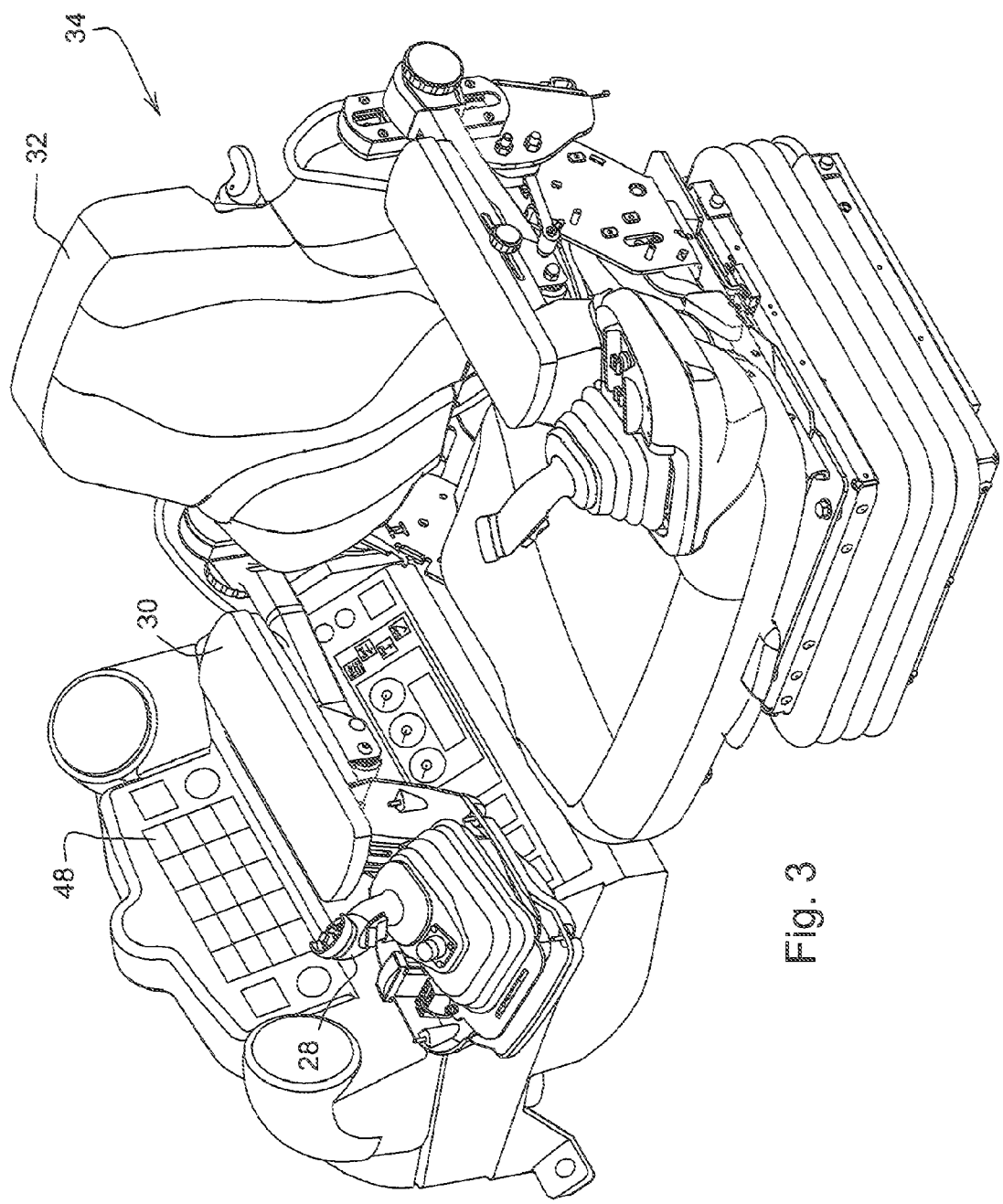
FIG. 3 is a perspective view of the interior of an exemplarily operator's station for the work machine.
Figure 4:
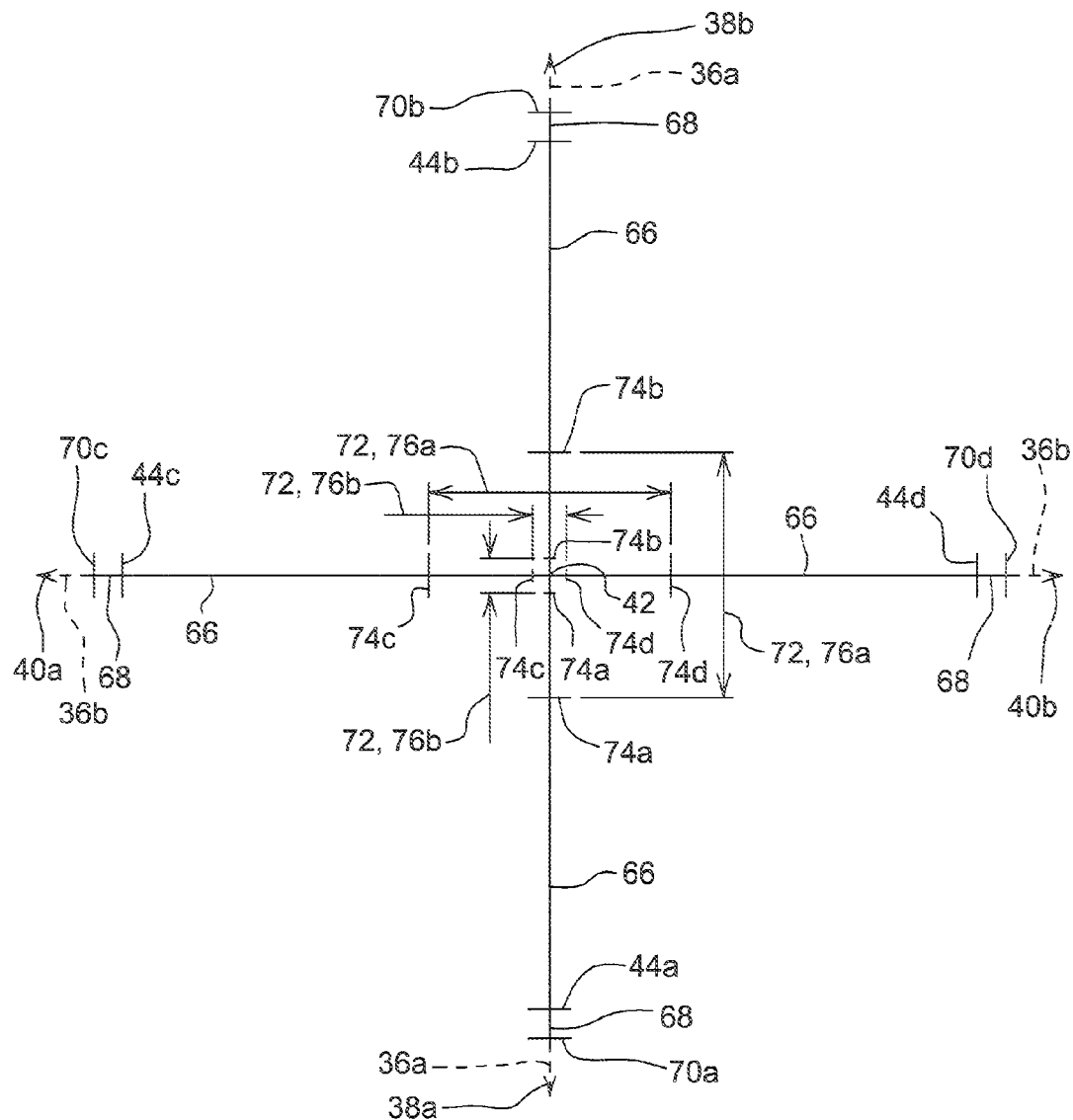
FIG. 4 is a diagrammatic view of a control pattern of an operator input device for activating and deactivating auto-control and manual-control modes.

Referring to FIGS. 3 and 4, the operator input device 28 is shown configured, for example, as a joystick, such as a right joystick mounted on a right armrest 30 of a seat 32 at an operator's station 34 of the work machine 10. The device 28 is pivotal about a first axis 36a in rearward and forward directions 38a, 38b, and pivotal about a second axis 36b to the left and right 40a, 40b. Movement in the rearward and forward directions 38a, 38b respectively raises and lowers the boom 16, and movement in the left and right directions 40a, 40b respectively rolls the bucket 18 in curl and dump directions. The operator input device 28 is biased by spring action to a neutral position 42 at the intersection of these four directions 38a, 38b, 40a, 40b.

The operator input device 28 is movable along each axis 36a, 36b relative to the neutral position 42 in an operating range. The operating range along each axis 36a, 36b includes a first zone 66 and a second, activate-auto zone 68. The first zone 66 is defined between the neutral position 42 and a respective first activate-auto position 44a, 44b, 44c, 44d. The second, activate-auto zone 68 is defined between the respective first activate-auto position 44a, 44b, 44c, 44d and a respective second activate-auto position 70a, 70b, 70c, 70d. A respective automatic hydraulic function is activated by displacement of the operator input device 28 into the second, activate-auto zone 68. It is to be understood that the term "zone" as used herein means either a single position (i.e., a single activate-auto position) or a range of positions (i.e., a range of activate-auto positions). FIG. 4 illustrates an example of such a range of positions, all of which represents a request for activation of a respective automatic hydraulic function.

An activate-auto zone 68 is located at the end of each direction 38a, 38b, 40a, 40b for requesting activation of a respective automatic hydraulic function. In particular, displacement of the operator input device 28 to a BHK activate-auto zone 68, or any activate-auto position thereof, requests activation of BHK. Displacement of the operator input device 28 to a RTC activate-auto zone 68, or any activate-auto position thereof, requests activation of RTC. Displacement of the operator input device 28 to a first RTD activate-auto zone 68, or any activate-auto position thereof, requests activation of RTD such that the bucket 18 is moved in the curl direction to the RTD position. Displacement of the operator input device 28 to a second RTD activate-auto zone 68, or any activate-auto position thereof, requests activation of RTD such that the bucket 18 is moved in the dump direction to the RTD position.

Tactile feedback is provided to the operator through the operator input device 28 to indicate a transition between the zones 66, 68. Such tactile feedback may be provided by different biasing forces in the zones 66, 68 back toward the neutral position. For example, the biasing force in the, zone 68 is greater than in the zone 66. As such, each zone 68 may be referred to as a "detent zone," and each position thereof may be referred to as a "detent position."

Figure 5A:
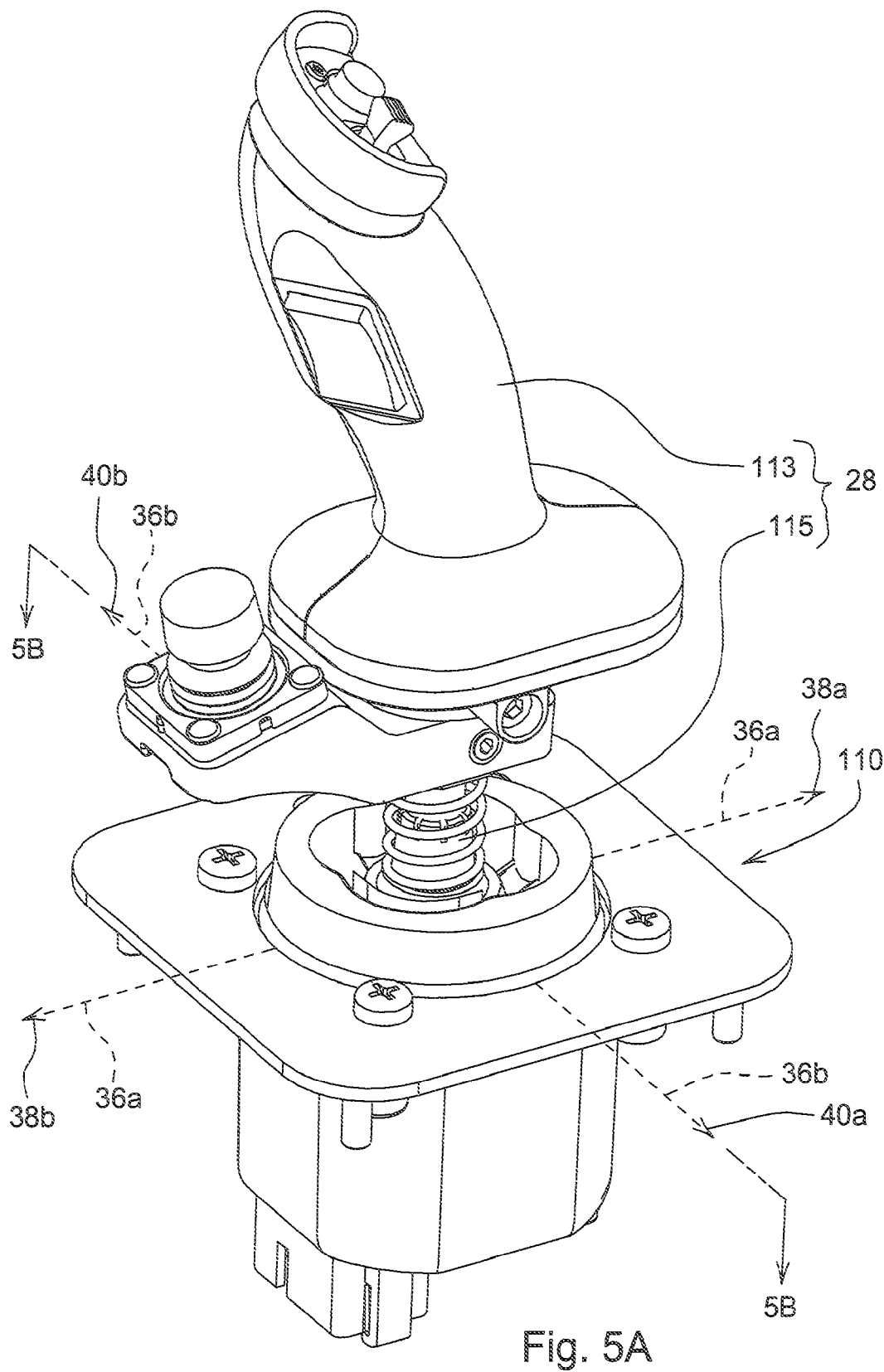
FIG. 5A is a perspective view showing the operator input device extending upwardly from a base assembly.

Referring to FIG. 5a, the operator input device 28 is shown rising from a base assembly 110. The operator input device 28 comprises a handle 113 mounted on a stem 115 extending between the handle 113 and the base assembly 110. Exemplarily, the base assembly 110 is a model AJ4 from the Cannon division of ITT Industries, Inc.

Figure 5B:
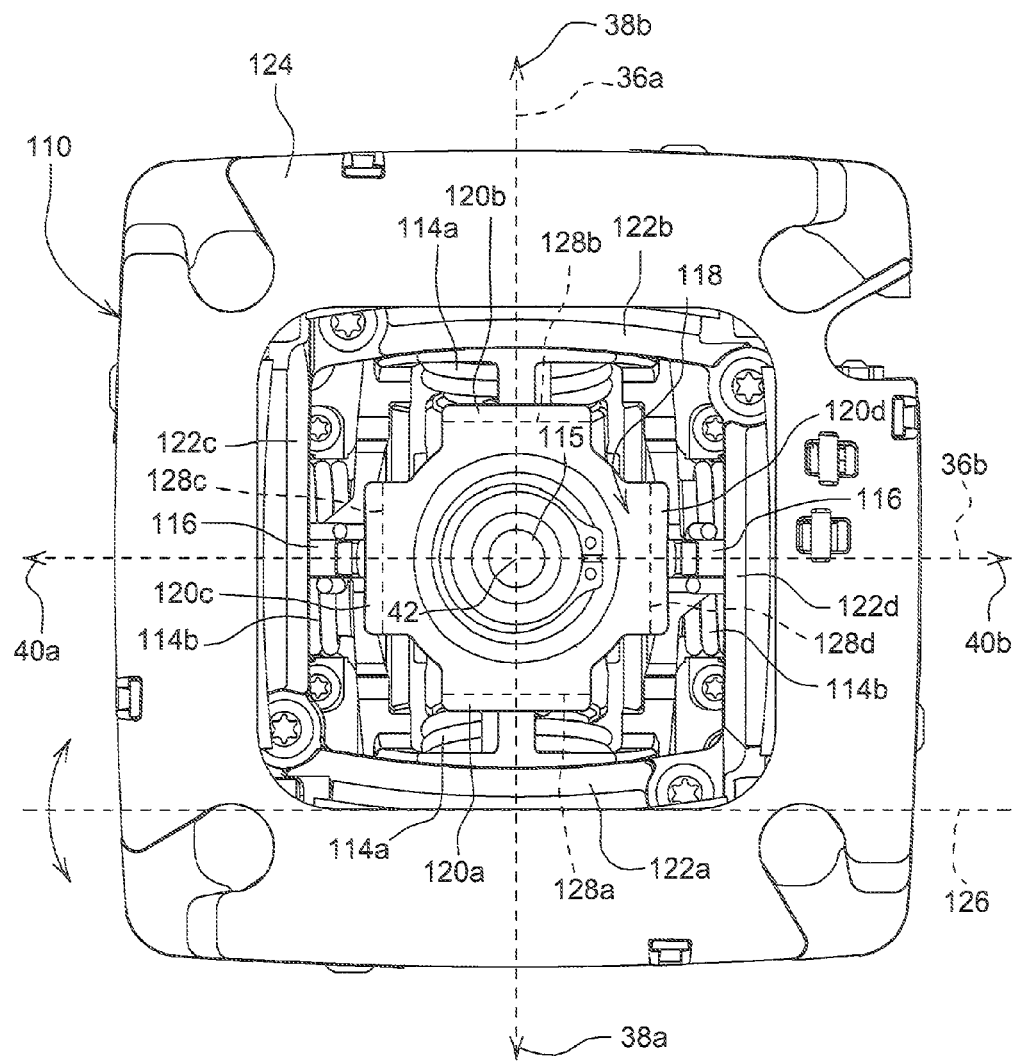
FIG. 5B is a top view in the direction of lines 5B-5B of FIG. 5A.

Referring to FIG. 5b, there is shown a top view of the base assembly 110. Two pins (not shown) perpendicular to one another extend through a bottom portion of the stem 115 to define the axes 36a, 36b. Two torsion springs 114a on opposite sides of the stem 115 provide a biasing force urging the operator input device 28 toward the neutral position 42 about the axis 36a, and two torsion springs 114b on opposite sides of the stem 115 provide a biasing force urging the operator input device 28 toward the neutral position 42 about the axis 36b. Each torsion spring 114a, 114b acts against a respective tab 116 mounted in fixed relation relative to the stem 115, two of such tabs 116 being shown in FIG. 5b along the axis 36b.

A collar 118 surrounds the stem 115 and is fixed thereto. The collar 118 travels with the stem 115 as the handle 113 is moved by the operator. The collar 118 has four wings 120a, 120b, 120c, 120d spaced evenly (e.g., 90 degrees) about the stem 115. The purpose of such wings 120a, 120b, 120c, 120d will become apparent from the discussion that follow.

Figure 6:
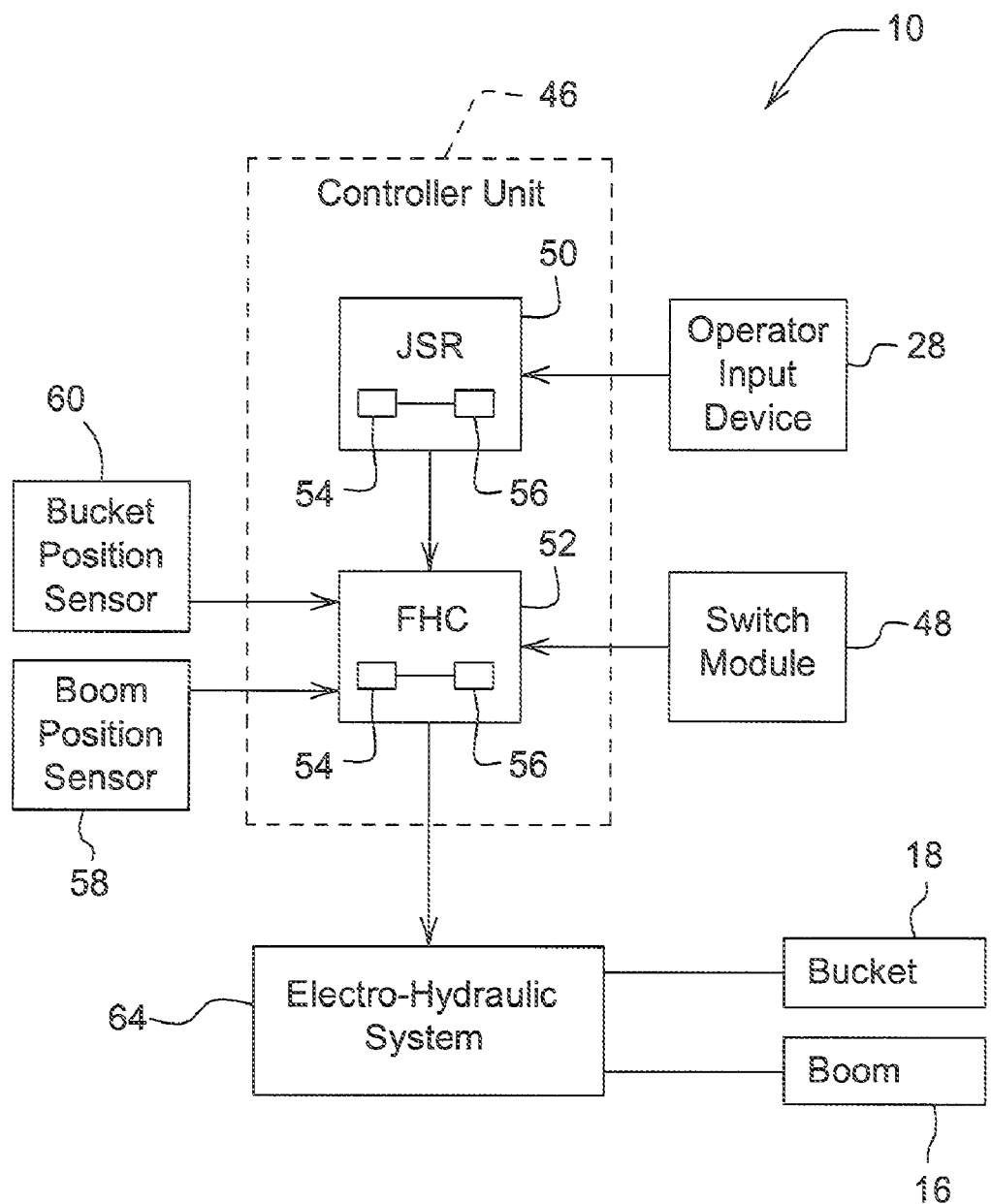
FIG. 6 is a diagrammatic view of a control system for the boom and bucket.

There are four catches 122a, 122b, 122c, 122d also spaced evenly (e.g., 90 degrees) about the stem 115. Each catch 122a, 122b, 122c, 122d is mounted to a housing 124 of the base assembly 110 for rotation about a catch axis 126, as shown in FIG. 6 with respect to catch 122a. Each catch 122a, 122b, 122c, 122d is biased to a home position shown in FIG. 6 by a respective catch torsion spring (not shown). Each catch 122a, 122b, 122c, 122d defines a respective activate-auto zone 68.

Consider, for example, movement of the stem 115 in the rearward direction 38a due to such movement of the handle 113 by the operator. The rearward wing 120a will eventually contact the rearward catch 122a when the stem 115 is moved far enough in the rearward direction 38a. Initial contact between the rearward wing 120 and the rearward catch 122a defines the first activate-auto position 44a of the rearward activate-auto zone 68. Further movement of the stem 115 in the rearward direction 38a in the rearward activate-auto zone 68 will cause the catch 122a to ride up over the wing 122a against the biasing force of the respective catch torsion spring. This biasing force in conjunction with the biasing force from the springs 114b provide the biasing force of the rearward activate-auto zone 68 back toward the neutral position 42, thereby providing the tactile feedback of the rearward activate-auto zone 68. Eventually, a shoulder 128a underneath the wing 120a will contact a stop of the housing 124 to arrest further movement of the stem 115 in the rearward direction 38a, thereby defining the second activate-auto position 70a of the rearward activate-auto zone 68. The foregoing description applies also to movement of the stem 115 in the other directions 38b, 40a, 40b.

Referring to FIG. 6, the work machine 10 has a controller unit 46 that communicates with the operator input device 28, a switch module 48, boom and bucket position sensors 58, 60, and an electro-hydraulic system 64. The controller unit 46 may be a single controller or a network of controllers. Exemplarily, the controller unit has a right joystick controller 50 ("JSR") and a Flex Hydraulic Controller 52 ("FHC"). Each controller 50, 52 has its own processor 54 and memory device 56 that is electrically coupled to the processor 54 and has stored therein instructions which, when executed by the processor 54, causes the processor 54 to perform the function(s) of the respective controller 50, 52.

The JSR 50 monitors the position of the operator input device 28. In particular, it receives position signals from position sensors that sense the position of the operator input device 28. For example, there may be a Hall-effect sensor for sensing the position of the device 28 relative to the axis 36a and another Hall-effect sensor for sensing the position of the device 28 relative to the axis 36b. A redundant Hall-effect sensor may be provided for each of the main Hall-effect sensors. The JSR 50 provides the position of the device 28 to the FHC 52 via a communication link (e.g., CAN bus).

The FHC 52 determines which mode is selected. The manual-control mode is activated until an auto-control mode is activated at which point the manual-control mode is deactivated. The FHC 52 activates an auto-control mode to perform a respective automatic hydraulic function in response to a position signal from the JSR 50 representative of displacement of the operator input device 28 to a respective activate-auto zone 68 relative to the neutral position 42, if such automatic hydraulic function has been enabled.

An operator may enable an automatic hydraulic function by actuating a respective enable-function switch of the switch module 48. The FHC 52 receives enablement signal(s) from the switch module 48, and uses enablement information represented thereby to determined which automatic hydraulic functions have been enabled. Further, if an operator enables both the RTC and RTD automatic hydraulic functions, subsequent movement of the operator input device 28 to an RTC auto-activate zone 68 will cause activation of both the RTC and RTD automatic hydraulic functions.

The FHC 52 receives boom and bucket position signals from the boom and bucket position sensors 58, 60, respectively. The boom position sensor 58 may be, for example, an angle sensor located at a pivot between the boom 16 and the frame 27 for sensing an angle of the boom 16 relative to the frame 27. For illustrative purposes only, it is shown in FIG. 1 on the right side of the frame 27, but could be, and preferably is, at a corresponding location on the left side of the frame 27. The bucket position sensor 60 may be, for example, an angle sensor located at a pivot between the boom 16 and a linkage 62 for sensing an angle of the bucket 18 relative to the boom 16. The FHC 52 uses the boom and bucket positions to provide feedback control of the boom 16 and bucket 18 as needed to perform the various automatic hydraulic functions. Depending upon the automatic hydraulic function requested by manual actuation of the operator input device 28, the FHC 52 will output a corresponding control signal to the electro-hydraulic system 64 to effect the desired automatic hydraulic function(s) for the boom 16 and/or bucket 18.

Referring back to FIG. 4, there is a non-responsive deadband 72 about the neutral position 42 along each axis 36a, 36b. The deadband is provided to prevent, or otherwise reduce the chance of, inadvertent deactivation of an auto-control mode and activation of the manual-control mode. Indeed, the FHC 52 both deactivates the auto-control mode and activates the manual-control mode in response to displacement of the operator input device 28 from the neutral position 42 through the deadband 72 about the neutral position 42 to an activate-manual position. There is such an activate-manual position 74a, 74b, 74c, 74d on either side of the neutral position 42 along each axis 36a, 36. As such, the deadband 72 along the axis 36a is defined between the activate-manual positions 74a, 74b, and the deadband 72 along the axis 36b is defined between the activate-manual positions 74c, 74d.

The FHC 52 may be programmed to change the size of the deadband 72 upon switching between an auto-control mode and the manual-control mode. As such, the deadband 72 may have a first size 76a in each auto-control mode and a different, second size 76b in the manual-control mode. Exemplarily, the first size may be larger than the second size such that the deadband 72 may enlarge from the second size 76b to the first size 76a upon activation of an auto-control mode and concomitant deactivation of the manual-control mode, and narrow from the first size 76a to the second size 76b upon deactivation of the auto-control mode and concomitant activation of the manual-control mode. In some embodiments, the deadband in an auto-control mode may be about 35% of the first zone 66 from the neutral position 42 on either side of the neutral position 42, and, in the manual-control mode, about 1% of the first zone 66 from the neutral position 42 on either side thereof.

Generally, incorporation of a deadband 72 reduces the chance of inadvertent operation of the electro-hydraulic system 64. More particularly, it reduces the chance of inadvertent deactivation of an auto-control mode. In an example, as alluded to above, the FHC 52 may be programmed to deactivate an auto-control mode upon movement of the operator input device 28 a predetermined distance out of the neutral position 42 to any activate-manual position 74a, 74b, 74c, 74d. The operator input device 28 may be biased to the neutral position 42 such that the biasing force returns the operator input device 28 to the neutral position 42 when, for example, the operator of the work machine 10 releases the operator input device 28 from an activate-auto position once the auto-control mode is activated. In situations in which the operator input device 28 can travel in opposite directions from the neutral position 42, momentum gained during the return trip of the operator input device 28 may urge the operator input device 28 beyond the neutral position 42, potentially resulting in inadvertent deactivation of the auto-control mode. Incorporation of the deadband 72, especially with the first size 76a, would prevent or otherwise reduce the chance that the return trip would inadvertently deactivate the just-activated auto-control mode. It would also reduce the chance of inadvertent deactivation of the auto-control mode due to bumping of the device 28 by the operator. Further, the first larger size 76a would not unnecessarily reduce the usefulness of the operating range of the device 28 since, in an auto-control mode, performance of the hydraulic function is independent of the position of the device 28.

Narrowing of the deadband 72 to the smaller, second size 76b for the manual-control mode would reduce the chance of inadvertent operation of the system 64 due to bumping of the device 28 by the operator. Further, the smaller size 76b would maximize use of the first zone 66 during the manual-control mode when performance of a hydraulic function is a function of the position of the device 28.

As mentioned above, it is possible to override an auto-control mode. In particular, the FHC 52 monitors the position of the operator input device 28, activates the auto-control mode in response to displacement of the operator input device 28 to an activate-auto zone 68 relative to the neutral position 42 of the operator input device 28, determines if the operator input device 28 is positioned in the activate-auto zone 68 as the object of the hydraulic function approaches the predetermined target position, and, if the operator input device 28 is so positioned, overrides the auto-control mode by commanding movement of the object of the hydraulic function past the predetermined target position.

The FHC 52 is programmed such that each auto-control mode comprises a ramp-down routine for ramping down the speed of the object of the hydraulic function as the object of the hydraulic function approaches the predetermined target position. The FHC 52 skips performance of the ramp-down routine during override of the auto-control mode. As such, the FHC 52 commands the electro-hydraulic system 64 to move the object of the hydraulic function at a constant speed from an approach side of the predetermined target position through the predetermined target position to a departure side of the predetermined target position during override of the auto-control mode. When the object of the hydraulic function reaches the predetermined target position, the FHC 52 activates the manual-control mode and concomitantly deactivates the auto-control mode.

Referring back to FIG. 2A, take, for example, that BHK has been activated by displacement of the operator input device 28 to the activate-auto position 44*a* of the respective activate-auto zone 68. As a result, the FHC 52 will automatically operate the electro-hydraulic system 64 to cause the boom 16 to raise toward the predetermined upper boom position 80. If the operator released the operator input device 28 say just after activation of BHK, the FHC 52 would begin to perform a ramp-down routine once the boom 16 enters a cushion zone, which, exemplarily, is about 30 degrees before the predetermined upper boom position, to slow the boom 16 down gradually until it is stopped at that position.

The FHC 52 will, however, continue to monitor the position of the operator input device 28. If it determines that the device 28 remains in the respective zone 68 as the boom 16 approaches the predetermined upper boom position, it will skip performance of the ramp-down routine in the cushion zone. Instead, it will command the electro-hydraulic system 64 to move the boom 16 at a constant speed (e.g., maximum speed) from an approach side 82 of the predetermined upper boom position through the predetermined upper boom position to a departure side 84 of the predetermined upper boom position during override of the auto-control mode. When the boom 16 reaches the predetermined upper boom position during such auto-control mode override, the FHC 52 activates the manual-control mode and concomitantly deactivates the auto-control mode.

As alluded to above, the controller unit 46 may be a single controller that performs the functions of the JSR 50 and the FHC 52 and any other functions. Hence, the term "controller unit" as used herein means one or more controllers. Further, the term "unit" means one or more of the subject component. Along these lines, the controller unit 24 has a processor unit, comprising one or more processors 54, and a memory unit, comprising one or more memory devices 56, electrically coupled to the processor unit and having stored therein instructions which, when executed by the processor unit, causes the processor unit to perform the various functions of the controller unit 46.

It is to be understood that the various signals disclosed herein may include not only times when the respective signal has a non-zero amplitude but also times when the respective signal may have a zero amplitude (i.e., OFF). The term "signal" thus applies to both situations.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of operating a work machine, the method comprising:
    monitoring the position of an operator input device,
    activating an auto-control mode in response to displacement of the operator input device to an activate-auto zone relative to a neutral position of the operator input device, the auto-control mode for automatically controlling performance of a hydraulic function in a predetermined manner independent of the position of the operator input device so as to move an object of the hydraulic function to, and stop the object of the hydraulic function at, a predetermined target position,
    determining if the operator input device is positioned in the activate-auto zone as the object of the hydraulic function approaches the predetermined target position, and
    if the operator input device is so positioned, overriding the auto-control mode by commanding movement of the object of the hydraulic function past the predetermined target position, wherein the overriding comprises commanding movement of the object of the hydraulic function at a constant speed from an approach side of the predetermined target position through the predetermined target position to a departure side of the predetermined target position.

2. The method of claim 1, wherein the auto-control mode comprises a ramp-down routine for ramping down the speed of the object of the hydraulic function as the object of the hydraulic function approaches the predetermined target position, and the overriding comprises skipping performance of the ramp-down routine.

3. The method of claim 1, wherein a manual-control mode is for controlling performance of the hydraulic function as a function of the position of the operator input device, and the overriding comprises activating the manual-control mode when the object of the hydraulic function reaches the predetermined target position.

4. A work machine, comprising:
    an operator input device,
    an electro-hydraulic system, and
    a controller unit that communicates with the operator input device and the electro-hydraulic system, the controller unit programmed to operate the electro-hydraulic system in an auto-control mode, the auto-control mode for automatically controlling performance of a hydraulic function in a predetermined manner independent of the position of the operator input device so as to move an object of the hydraulic function to, and stop the object of the hydraulic function at, a predetermined target position, the controller unit adapted to:
        monitor the position of the operator input device,
        activate the auto-control mode in response to displacement of the operator input device to an activate-auto zone relative to a neutral position of the operator input device,
        determine if the operator input device is positioned in the activate-auto zone as the object of the hydraulic function approaches the predetermined target position, and if the operator input device is so positioned, override the auto-control mode by commanding movement of the object of the hydraulic function past the predetermined target position, wherein the controller unit is adapted to command movement of the object of the hydraulic function at a constant speed from an approach side of the predetermined target position through the predetermined target position to a departure side of the predetermined target position during override of the auto-control mode.

5. The work machine of claim 4, wherein the auto-control mode comprises a ramp-down routine for ramping down the speed of the object of the hydraulic function as the object of the hydraulic function approaches the predetermined target position, and the controller unit is adapted to skip performance of the ramp-down routine during override of the auto-control mode.

6. The work machine of claim 4, wherein the controller unit is programmed to operate the electro-hydraulic system in a manual-control mode for controlling performance of the hydraulic function as a function of the position of the operator input device, and the controller unit is adapted to activate the manual-control mode when the object of the hydraulic function reaches the predetermined target position.

* * * * *